United States Patent
Siren

(10) Patent No.: US 9,301,631 B2
(45) Date of Patent: Apr. 5, 2016

(54) SCOOP USED IN COOKING AND/OR PORTIONING FOOD

(71) Applicant: Juhani Siren, Helsinki (FI)

(72) Inventor: Juhani Siren, Helsinki (FI)

(73) Assignee: MAGISSO OY, Helsinki (FI)

( * ) Notice: Subject to any disclaimer, the term of this patent is extended or adjusted under 35 U.S.C. 154(b) by 182 days.

(21) Appl. No.: 14/152,468

(22) Filed: Jan. 10, 2014

(65) Prior Publication Data

US 2014/0190022 A1    Jul. 10, 2014

(30) Foreign Application Priority Data

Jan. 10, 2013  (EP) .................................. 13150816

(51) Int. Cl.
| | |
|---|---|
| *A47J 43/28* | (2006.01) |
| *A47G 21/04* | (2006.01) |
| *A47G 21/06* | (2006.01) |
| *G01F 19/00* | (2006.01) |
| *A47G 21/00* | (2006.01) |

(52) U.S. Cl.
CPC ................ *A47G 21/06* (2013.01); *A47G 21/04* (2013.01); *A47J 43/281* (2013.01); *G01F 19/002* (2013.01); *A47G 2021/002* (2013.01)

(58) Field of Classification Search
CPC . A47G 2021/002; A47G 21/04; A47G 21/06; A47G 43/281; G10F 19/002
USPC ........................................................ 30/324
See application file for complete search history.

(56) References Cited

U.S. PATENT DOCUMENTS

| | | | | |
|---|---|---|---|---|
| 1,521,768 A | | 1/1925 | Herrmann | |
| 1,851,942 A | * | 3/1932 | Christie | .................. A47G 21/04 30/328 |
| 2,583,154 A | * | 1/1952 | Pape | ........................ A47L 13/52 15/257.7 |
| 2,598,987 A | * | 6/1952 | Franzen | ............... B65D 51/246 215/228 |
| 3,828,999 A | * | 8/1974 | Humphrey | ............. A47G 21/04 229/401 |

(Continued)

FOREIGN PATENT DOCUMENTS

| | | |
|---|---|---|
| DE | 202006005439 U1 | 7/2006 |
| EP | 1142522 A1 | 10/2001 |

(Continued)

OTHER PUBLICATIONS

European search report dated Jul. 19, 2013, corresponding to EP13150816.

*Primary Examiner* — Hwei C Payer

(74) *Attorney, Agent, or Firm* — Ladas & Parry LLP

(57) ABSTRACT

The invention relates to a scoop (1) used in cooking and/or portioning food, comprising a plate-like, elongated handle (10) and a plate-like scoop blade (20) as its extension. The handle (10) is provided with at least one weakening line (11) in the longitudinal direction of the handle (10), which allows the handle (10) to be bent into a chute by pressing the handle (10). The scoop blade (20) is provided with two or more weakening lines (21, 22), which join the longitudinal weakening line (11) or weakening lines of the handle (10) in such a way that the scoop blade (20) bends into a chute, cup, spoon or dish forced by the bending of the handle (10) into a chute. The weakening lines (11, 21) are formed of elastic material (13), which is more elastic than the scoop material. At the weakening lines there are slots (14) in the scoop material, which are filled up with the said elastic material (13).

7 Claims, 4 Drawing Sheets

(56) References Cited

U.S. PATENT DOCUMENTS

Figure 5:
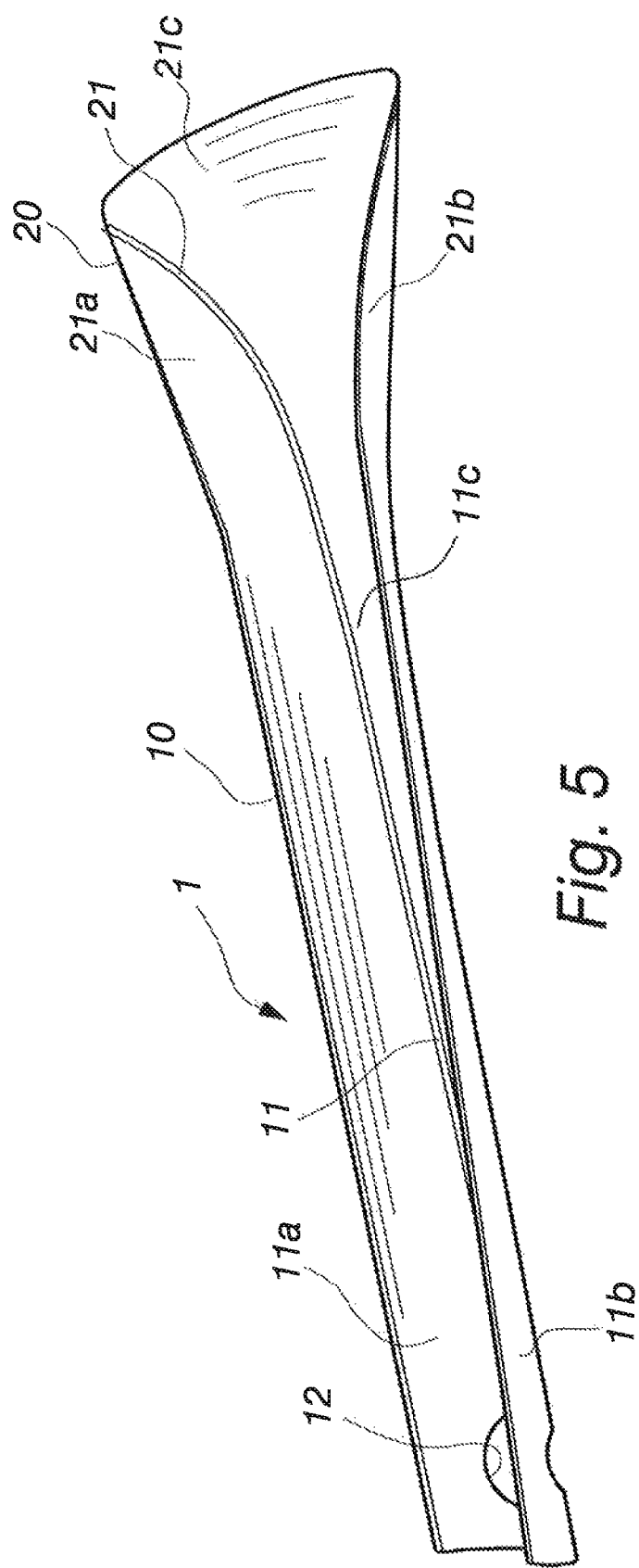

| | | | | |
|---|---|---|---|---|
| 3,914,884 A | * | 10/1975 | Guinot | E02F 3/40 172/372 |
| 3,931,925 A | * | 1/1976 | Ruff | A47G 21/04 229/125.03 |
| 4,218,010 A | * | 8/1980 | Ruff | A47G 21/04 229/125.03 |
| 5,203,548 A | * | 4/1993 | Sanders | A47J 47/005 269/289 R |
| 6,817,480 B1 | * | 11/2004 | Baldasio | B65D 81/245 220/216 |
| D651,480 S | * | 1/2012 | Cross | D7/642 |
| D686,045 S | * | 7/2013 | Stewart | D7/401.2 |
| 2014/0190022 A1 | * | 7/2014 | Siren | A47J 43/281 30/324 |

FOREIGN PATENT DOCUMENTS

| | | |
|---|---|---|
| EP | 2 591 708 A1 * | 5/2013 |
| FR | 2499841 A1 | 8/1982 |
| GB | 2052246 A | 1/1981 |
| GB | 2204781 A | 11/1988 |
| JP | 2005040285 A | 2/2005 |

* cited by examiner

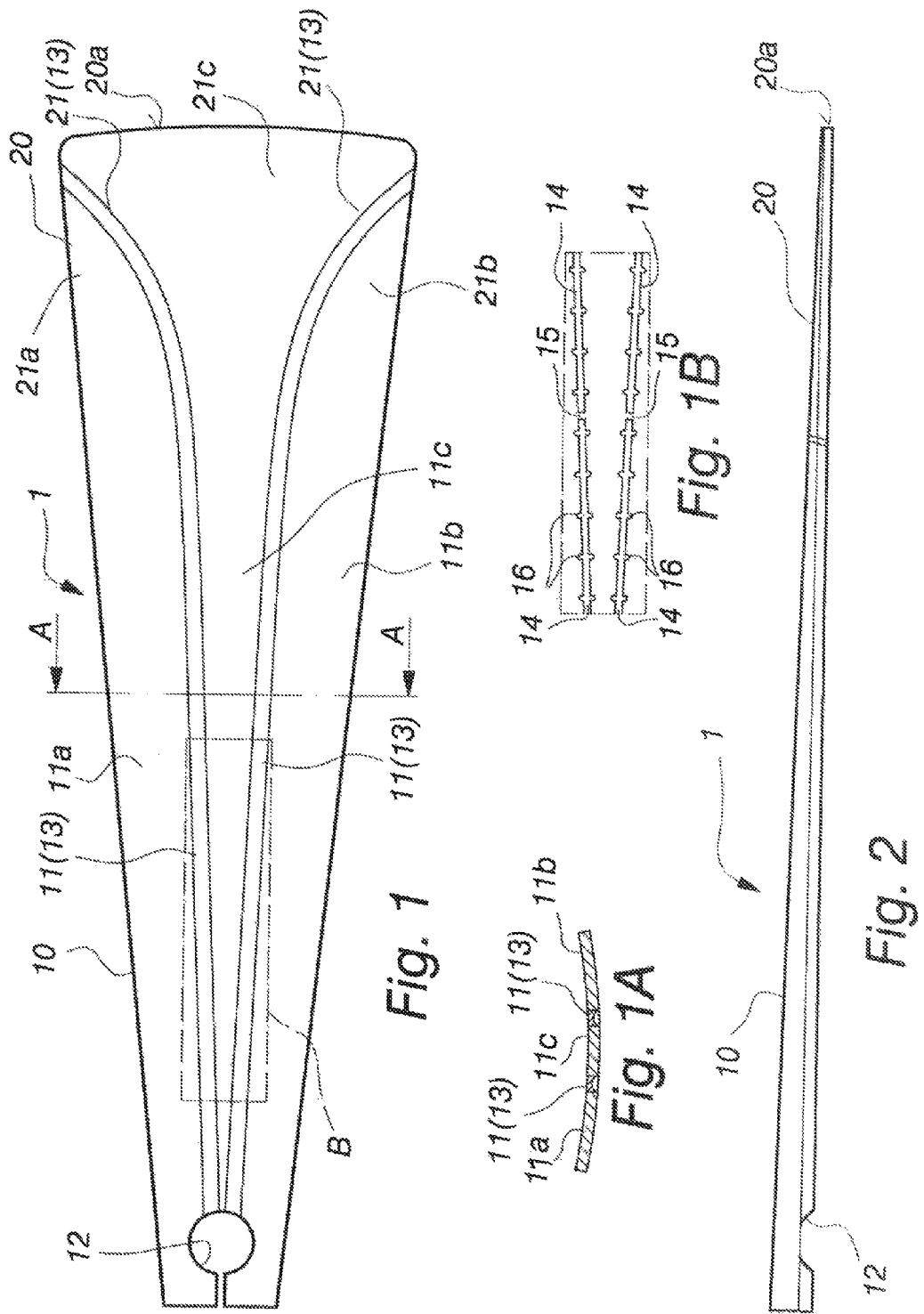

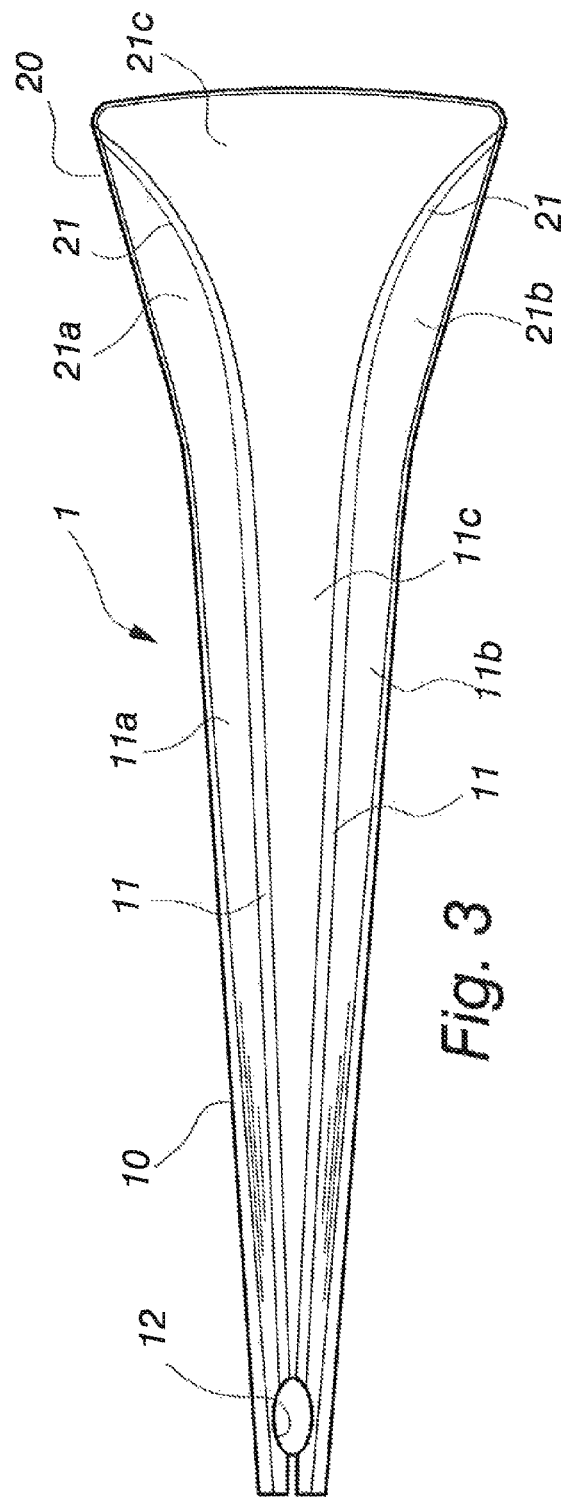
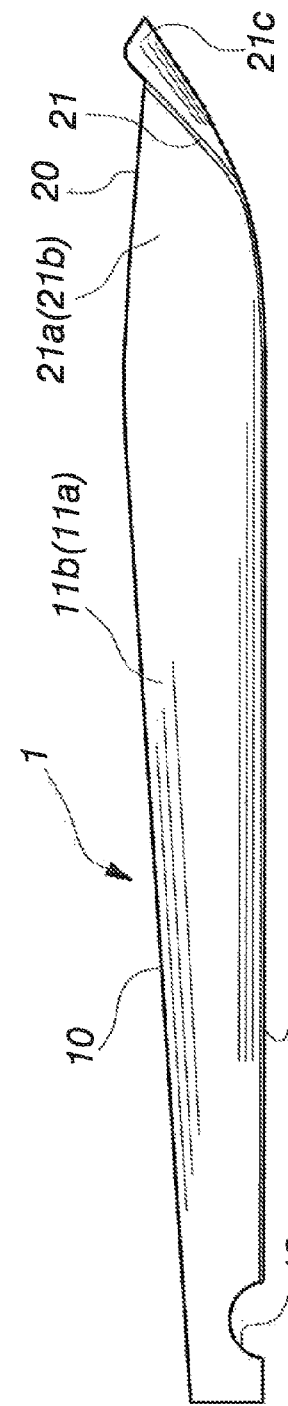

SCOOP USED IN COOKING AND/OR PORTIONING FOOD

This application claims priority to European Patent Application No. 13150816.0, filed Jan. 10, 2013.

The present invention relates to a scoop used in cooking and/or portioning food, comprising a plate-like, elongated handle and a plate-like scoop blade as its extension. The handle is provided with at least one weakening line in the longitudinal direction of the handle, which allows the handle to be bent into a chute by pressing the handle. The scoop blade is provided with two or more weakening lines, which join the longitudinal weakening line or weakening lines of the handle in such a way that the scoop blade is bent into a chute, cup, spoon or dish forced by the bending of the handle into a chute.

Previously are known scoops of this type which have traditionally been made of wood. They are typically utensils intended for cooking taking place by a stove and/or an oven, comprising a handle, a shaft usually as an extension of the handle or in conjunction with it, and a scoop part (scoop blade) as an extension of the shaft (or handle). Nowadays, also heat-resistant plastics, such as polyamide, are used as material instead of wood. They are suitable for use, for example, with so-called Teflon pans or the like and are also dishwasher-safe.

These types of scoops are mainly intended for use in connection with preparing food. Therefore, removing and portioning all of the food from the cooking dishes (for example, meat and pan juice from a frying pan or pasta/rice from a saucepan) is difficult with this type of a scoop. There are various utensils known as such for removing prepared food from a dish intended for cooking. These include, for example, a ladle, a pasta server and a spoon. Therefore, various utensils are often required for cooking and serving/portioning prepared food.

To avoid this disadvantage, from the publications EP 1 142 522 A1, GB 2 052 246 A, WO 90/14785 and U.S. Pat. No. 1,521,768 are known scoops of the type mentioned at the beginning, by means of which the handling of food after preparation can also easily be carried out, thus facilitating and speeding up especially handling following cooking, such as portioning. In these known scoops, the weakening lines are implemented as thinnings of the scoop's plate material. Since the scoop material must be made of relatively hard material, which is somewhat flexible but not very elastic, a disadvantage of these known scoops is that after several times of use, the scoop will no longer return to the almost planar shape, but remains in the bent shape resulting from pressing the handle. Therefore, the desired dual functioning as a scoop and a portioning means is not properly achieved. Furthermore, the weakening line may break in long-term use.

The aim of the present invention is to provide a utensil used in cooking, by means of which the disadvantages of the above-mentioned known scoops can be avoided.

To achieve the above aim, the present invention is characterised in that the weakening lines are formed of elastic material, which is more elastic than the scoop material, that at the weakening lines there are slots in the scoop material, which separate the scoop material into plate parts which are joined together by thin necks of scoop material, that the slots are filled up with the said elastic material.

With this is achieved the aim of the invention, where in a single cooking utensil is combined the food preparation function and the food handling function following cooking, so that both functions can easily be carried out with the same utensil and that this property remains also in long-term use. The use of several utensils is thus avoided.

Preferred embodiments of the invention are disclosed in the dependent claims.

Figure 6:
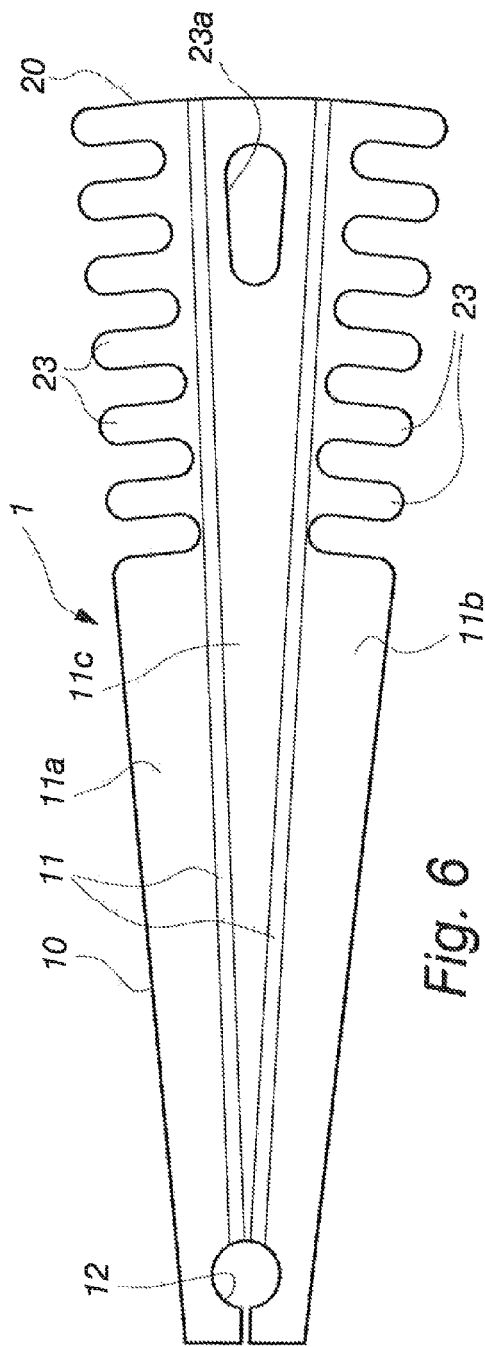
Figure 7:
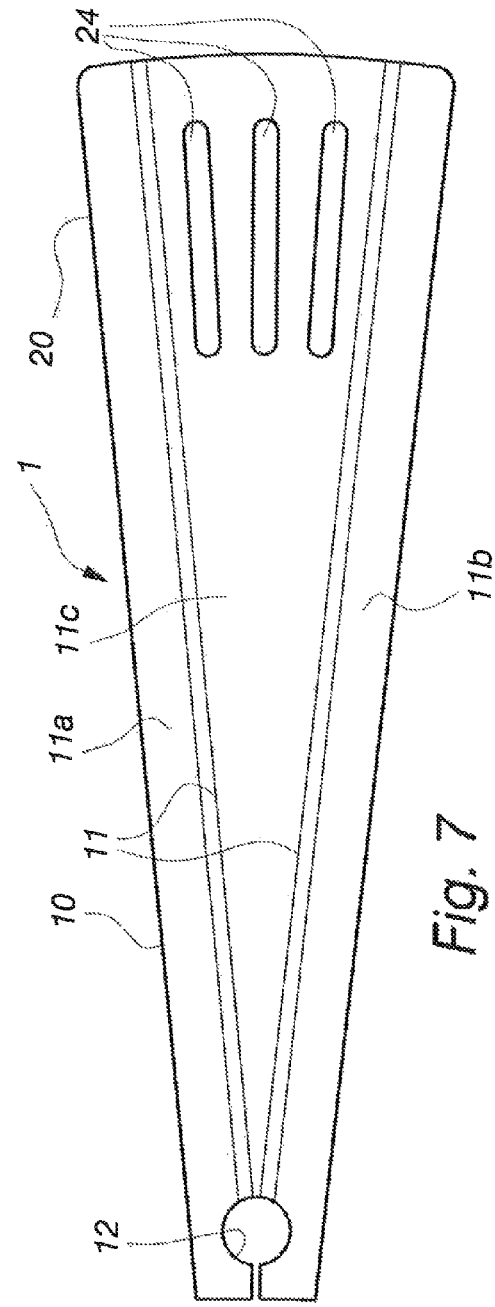

The invention is described in greater detail in the following, with reference to the accompanying drawings, in which:

FIG. 1 shows a top view of a scoop according to a preferred embodiment of the invention when straight, FIG. 1A shows a section of FIG. 1 along line A-A, FIG. 1B shows the scoop material without elastic material in sub-area B of FIG. 1, FIG. 2 shows a side view of the scoop shown in FIG. 1, FIG. 3 shows a top view of the scoop of FIGS. 1 and 2 when bent, FIG. 4 shows the scoop of FIG. 3 from the side, FIG. 5 shows an axonometric view of a scoop bent according to FIGS. 3 and 4, FIG. 6 shows a top view of a second preferred embodiment of the scoop according to the invention when straight, and FIG. 7 shows a top view of a third preferred embodiment of the scoop according to the invention.

FIGS. 1 and 2 thus show a scoop according to the invention, which is marked with reference numeral 1. Here, the scoop 1 is made of a plate-like element, the material of which is preferably plastic, such as polyamide. The basic parts of the scoop 1 include a handle, marked with reference numeral 10, and a plate-like scoop blade provided as its extension, marked with reference numeral 20. In this case, the handle 10 is the narrow first end of the scoop 1, which widens as a sector towards the scoop blade 20. Furthermore, the scoop blade 20 is the second end, widening as a sector as a direct extension of the handle 10, which ends in the longitudinal direction of the scoop, preferably in a curved or essentially straight edge or tip 20a. The scoop according to FIGS. 1 and 2 can be used, for example, as an ordinary spatula.

The handle 10 of the scoop 1 according to FIGS. 1 and 2 is provided with two weakening lines, marked with reference numeral 11, in the longitudinal direction of the handle 10. These weakening lines 11 continue in the scoop blade 20 area as weakening lines 21 curving towards the side edges of the scoop blade, which end in the side edges in the vicinity of the scoop blade tip 20a.

The handle 10 is thus divided into three adjacent plate parts 11a, 11c and 11b. The outermost plate parts 11a and 11b can be turned towards one another with respect to the hinge axles determined by the weakening lines 11, as shown in FIGS. 3 and 4. The handle 10 thus becomes chute-like. At the same time, the scoop blade 20 bends into a cup or dish as shown in FIGS. 3 and 4, forced by the bending of the handle 10 into a chute and allowed by the curved weakening lines 21 provided in the scoop blade. It is noted that in the scoop blade 20 are thus formed three planar bending segments 21a and 22a and 22b of the scoop blade 20, which are constituted by the plate surfaces bent into curved form, thus forming the above-mentioned cup or dish.

This embodiment is particularly advantageous for moving and portioning liquid foods (broths, sauces, etc.) directly from the dish intended for cooking.

The above-mentioned weakening lines 11 in the handle and the weakening lines 21 in the scoop blade are made of an elastic material 13, which is more elastic than the plate material. The elastic material is preferably silicone. Heat-resistant thermoelastomeres and rubber compounds may also be used. At the weakening lines in the scoop material are slots 14 which divide the scoop material into plate parts 11a, 11b, 11c in the area of the handle and into plate parts 21a, 21b, 21c in the scoop blade area. The plate parts of the handle 10 continue solidly as plate parts of the scoop blade. These three adjacent plate parts are connected to one another by means of thin necks 15 of scoop material, the purpose of which is only to keep the plate parts attached to one another during manufacture. The necks 15 are thus short necks at distances from one another, which are thinner than the thickness of the scoop material. In the finished scoop, the necks 15 may break, because the elastic material binds the plate parts to one another. The slots 14 are filled up with the said elastic material 13 which attaches to the edges of the slots 14 and binds the plate parts into a uniform scoop. At the edges of the slots 14 are gripping formations 16 for attaching the elastic material to the scoop material. These gripping formations may be surface roughenings or preferably constitute a form lock between the scoop material and the elastic material.

The width of the slots is preferably more than 1.5 mm in order to give good elasticity and strength to the weakening lines. The two weakening lines in the handle (as opposed to one) reduce the force required to press the scoop into a chute. Thus also the stress exerted on the weakening lines diminishes and strength increases.

The thickness of the scoop material becomes thinner when moving from the handle 10 area to the scoop blade 20 area. In the scoop blade area, the elastic material 13 is preferably made as thick as the scoop material. In the handle area, the elastic material is thinner than the scoop material, whereupon grooves are formed at the weakening lines 11 on the underside of the scoop 1 (FIG. 1A). The elastic material of the weakening lines thus acts as membrane hinges, by means of which the different parts 11a, 11b, 11c (in the handle), 21a, 21b and 21c (in the scoop blade) of the scoop 1 turn with respect to one another and enable the scoop 1 to bend into the position shown in FIGS. 3 and 4. On the top side of the scoop, the elastic material and the harder scoop material are on the same level, in which case no grooves are formed on the top surface of the handle or on either surface of the scoop blade.

In addition to the elastic material of the weakening lines, the scoop material may be of a somewhat resilient substance, whereby the scoop 1 bent in accordance with FIGS. 3 and 4 will return by spring action to the straightened position shown in FIGS. 1 and 2.

The first end of the scoop 1 is provided with a hole 12 or other means by which the scoop can be placed to hang for storage, for example, on a storage hook mounted on the wall.

FIG. 6 shows a second preferred embodiment of the invention. In it, the handle 10 comprises two weakening lines 11 which distance from one another as a sector towards the scoop blade 20, extending in straight form across the scoop blade 20. These two weakening lines 11 thus divide the scoop 1 into the two bending parts 11a and 11b and in addition to a centre part 11c which remains between them. The scoop blade will then also bend into a chute like the handle 10. The parts of the scoop blade 20 extending from the bending parts 11a and 11b are formed into successive fork-like projections 23 or teeth. The projections 23 preferably extend transversely to the longitudinal direction of the adjacent weakening lines 11. In addition to functioning as a mixer and a scoop during the preparation of pasta (for example, spaghetti) or noodles, when bent in accordance with the invention, the scoop 1 according to this embodiment also functions as a server for removing them from the boiling water or for portioning them. Excess liquid (boiling water) can be drained through a hole 23a made in the centre part 11c. The hole 23a is preferably made in the scoop blade 20 area.

FIG. 7 further shows a third preferred embodiment of the invention. Also in this case, the handle 10 comprises two weakening lines 11 which distance from one another as a sector towards the scoop blade 20, extending in straight form across the scoop blade 20. These two weakening lines 11 thus divide the scoop 1 into two bending parts 11a and 11b and in addition into a centre part 11c which remains between them. The scoop blade 20 will then also bend into a chute. In this embodiment, in the centre part 11c of the scoop, within the scoop blade area 20, is made a plurality of openings 24, which are in this case elongated and made directly in the centre part 11c. The openings may also be of a different shape, for example, round or square, and their number may be optional. The openings 24 may also be arranged so densely that they form a meshy perforated surface in the scoop blade 20 area. The scoop 1 shown in FIG. 7 is also suitable as a server, especially for rice and other processed foods of structurally similar size, such as couscous grains. The size of the holes 24 is selected in such a way that processed foods of the size of rice and couscous grains will not fall from the bent scoop 1, but excess boiling water will drain off through them. Furthermore, the bending parts 11a and 11b bent in accordance with FIGS. 3 and 4 prevent the processed food from falling off the edges, which facilitates and speeds up the portioning of such processed foods.

In the embodiments of FIGS. 6 and 7, the weakening lines are made of elastic material 13 in the manner described in connection with FIGS. 1 and 2.

The present invention is not limited to the embodiments disclosed, but may be applied in many ways within the scope of protection of the appended claims.

The invention claimed is:

1. A scoop used in cooking and/or portioning food, comprising a plate-like, elongated handle and a plate-like scoop blade as its extension, the handle being provided with at least one weakening line in the longitudinal direction of the handle, which allows the handle to be bent into a chute by pressing the handle, and the scoop blade being provided with two or more weakening lines, which join the at least one weakening line of the handle in such a way that the scoop blade (20) bends into a chute, cup, spoon, or dish forced by the bending of the handle into a chute, wherein all of the weakening lines are formed of elastic material, which is more elastic than a material of the scoop blade, wherein, at all of the weakening lines, there are slots in the material of the scoop blade, which separate the material of the scoop blade into plate parts which are joined together by thin necks of material of the scoop blade, and wherein the slots are filled up with the elastic material.

2. The scoop as claimed in claim 1, wherein at edges of the slots are gripping formations for attaching the elastic material to the material of the scoop blade.

3. The scoop as claimed in claim 1, wherein, in the handle, are two adjacent weakening lines, which diverge from each another towards the scoop blade, wherein the two adjacent weakening lines extend across the scoop blade.

4. The scoop as claimed in claim 1, wherein the elastic material is silicone.

5. The scoop as claimed in claim 1, wherein the handle and the scoop blade are of the same plate material which is divided by the slots in all of the weakening lines into three plate parts which are connected to one another by the elastic material which fills the slots.

6. The scoop as claimed in claim 3, wherein in the scoop blade, the two adjacent weakening lines curve towards the side edges of the scoop blade and end in side edges of the scoop blade in the vicinity of a tip of the scoop blade.

7. The scoop as claimed in claim 2, wherein the gripping formations constitute a form lock between the material of the scoop blade and the elastic material.

* * * * *